United States Patent [19]

Karpenko

[11] 4,007,906

[45] Feb. 15, 1977

[54] MAIN STEAM ISOLATION VALVE

[75] Inventor: Anatole N. Karpenko, San Francisco, Calif.

[73] Assignee: Anchor/Darling Valve Company, Hayward, Calif.

[22] Filed: June 16, 1975

[21] Appl. No.: 586,964

Related U.S. Application Data

[63] Continuation-in-part of Ser. No. 432,858, Jan. 14, 1974, abandoned.

[52] U.S. Cl. .................. 251/26; 251/29; 251/203; 251/30
[51] Int. Cl.² .................. F16K 31/122
[58] Field of Search .......... 251/31, 28, 29, 25, 251/26, 203

[56] References Cited

UNITED STATES PATENTS

| | | | |
|---|---|---|---|
| 607,265 | 7/1898 | McLean | 251/31 |
| 2,707,483 | 5/1955 | Shafer | 251/31 X |
| 2,859,010 | 11/1958 | Ferrell | 251/28 |
| 3,379,404 | 4/1968 | Anderson | 251/26 |

*Primary Examiner*—Arnold Rosenthal

[57] ABSTRACT

Main steam isolation valves are required for both PWR and BWR nuclear steam supply systems. In the event of a main steam line rupture, these valves must prevent gross loss of steam. The pressure drop across the valves is a direct factor in the efficiency of the generating plant. The rate of steam flow through the valves is high. These conditions require large port diameter valves that are reliable, can close rapidly, have low pressure drops, and are suitable for operation at specified design pressure and temperature. The valve of the present invention includes a parallel seat, fully revolving, double disc gate valve and fully satisfies the above requirements. The valve of the present invention embodies a valve operating mechanism which is fully enclosed within the primary pressure containment of the valve. This precludes any part of the operator being damaged by missiles resulting from other system failures. The energy source for the operator is the steam in the pipeline itself, providing assurance that any time energy is needed to close the valve, it is available and, should the steam pressure fail, the valve will close by itself. Another energy source, in the form of an independent pressure system, is also included which may move the valve operator to open or close the valve or to "exercise" the valve. Solenoid actuated control valves selectively provide the mode of operation while electrical switches detect the position of the valve operator.

11 Claims, 12 Drawing Figures

NORMAL CLOSED POSITION

NORMAL OPENING MODE

NORMAL OPEN POSITION

NORMAL CLOSING MODE

EXERCISE MODE

EXERCISE CONTROL VALVE MODE

EXERCISE OPEN POSITION
ZERO PRESSURE IN PIPELINE

MAIN STEAM ISOLATION VALVE

This is a continuation-in-part of application Ser. No. 432,858, now abandoned filed Jan. 14, 1974.

BACKGROUND OF THE INVENTION

For several years there has been an increasing demand for dependable pipeline closures in large sizes, in some cases even for pressures in excess of 1,000 pounds per square inch and temperatures as high as 1800° F. One of the major industrial developments creating these new requirements is a nuclear energy powered electrical generating plant. Because of the enormous power available in nuclear energy, it is possible to construct a single generating plant which is many times the capacity of one of the older conventional plants. In addition, the normal hazards of plant operation are greatly increased in the nuclear power plant, because of the nature of the process and its control and the radiation effects of the materials and the process. These increased hazards have placed a greater importance upon the reliability of the hardware used in the plant.

The valve of the present invention embodies a valve operating mechanism which is fully enclosed within the primary pressure containment of the valve. This precludes any part of the operator being damaged by missiles resulting from other system failures. The energy source for the operator is the steam in the pipeline itself, providing assurance that any time energy is needed to close the valve, it is available and, should the steam pressure fail, the valve will close by itself. Control of the valve operator is performed from a remote site through an appropriate control system and with the system having a fail safe characteristic to allow the valve to close in an emergency.

SUMMARY OF THE INVENTION

The double disc valve design of this invention is unique in that there are two independent discs, and during each closing stroke, immediately prior to the disc seating, each disc rotates a few degrees in the plane of the seats. This rotating feature permits each disc to seat in a different position on each closing stroke, providing for equal wear and preventing small imperfections from being agitated into major leakage problems.

The closing wedge assembly is designed to impart sufficient thrust to each disc to maintain acceptable low pressure seat leakage. As the differential pressure across the disc increases, the seating load also increases, thus maintaining acceptable leakage through the entire range of operating differential pressures. Since the discs are completely independent of each other, the design is essentially symmetrical and zero leakage can be maintained in either direction depending only on the direction of flow. This feature eliminates the necessity of installing a check valve to stop reverse flow.

Large port diameter valves of this invention (up to 48 inch) have been designed and manufactured to close in less than one second. Rapid closure of the present valve is possible because the internal moving parts halt independently of each other, resulting in several small impacts instead of one large impact as would be the case if all internal parts were rigidly attached to each other. The largest of these impact loads is taken directly through the body of the valve instead of being taken by the seating surfaces and then distributed to the valve body, resulting in much greater service life for the seating surfaces.

Valves embodying this invention have been used in services from −320° to upwards of 1200° F. The unique feature of releasing the wedging action prior to moving the disc or unseating the valve guarantees that the valve will not "jam" shut from either the closing loads or temperature changes. In actual operation the upper wedge is disengaged from the lower wedge; any unbalanced pressure will then cause the upstream disc to move away from the upstream seat completely freeing all internal parts.

Even with the improved double disc valve design, the extreme operational requirements of nuclear power service require that the valve may be exercised to ensure free movement of the valve. Similarly, provision is made to move the valve in the absence of line steam pressure.

BRIEF DESCRIPTION OF THE PREFERRED EMBODIMENT

Figures 1, 2:
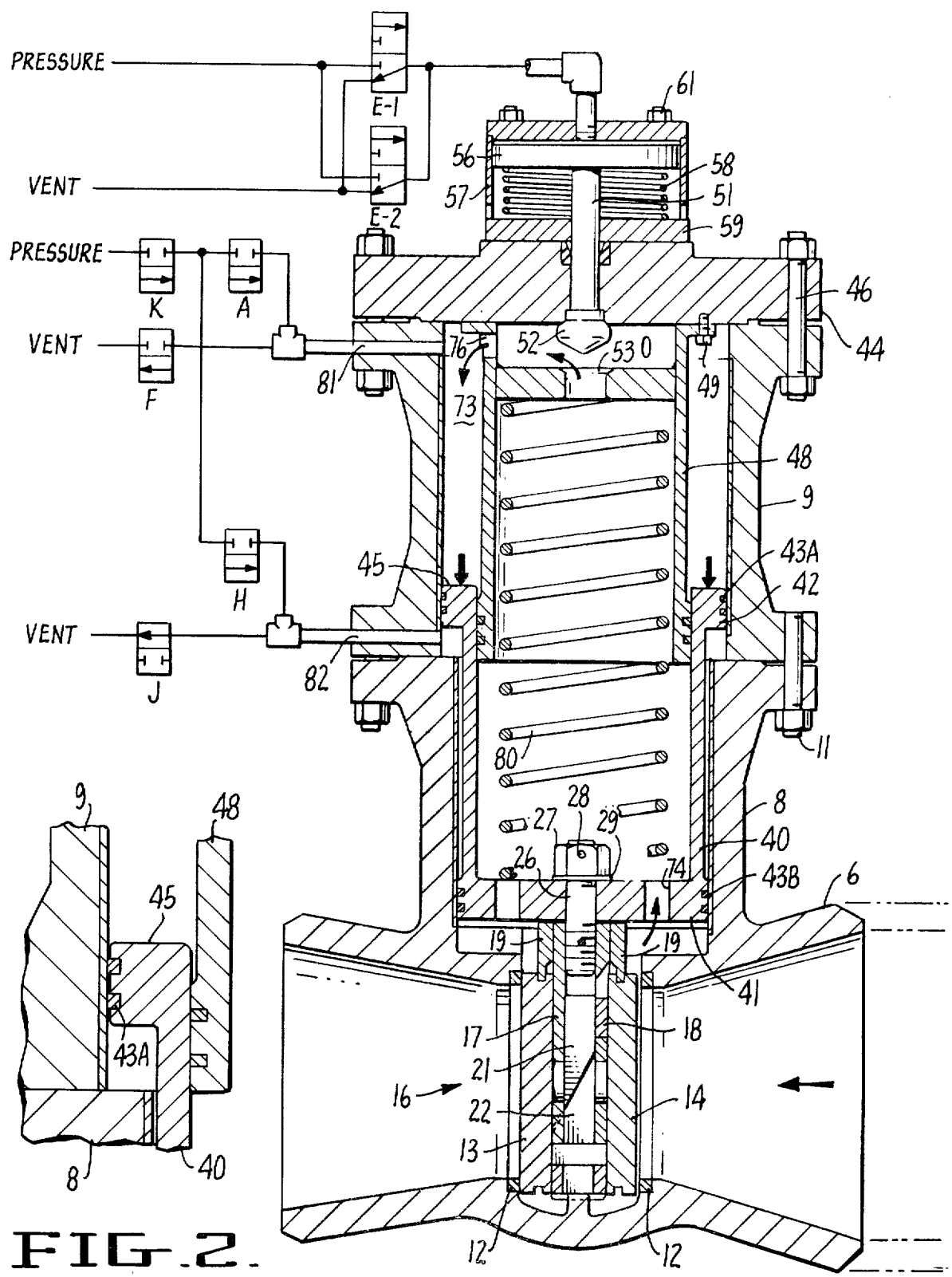
FIG. 1 is a side elevation partly in section showing a valve embodying the present invention, the valve being in closed position.
FIG. 2 is an enlarged, fragmentary, sectional view of a portion of the piston, cylinder and guide of the invention.

The valve of the present invention includes a valve body, generally indicated at 6, which is adapted to be welded at either end into a steam line. Flow in the line can be in either direction since the valve is symmetrical. The body includes an upwardly extending sleeve neck 8 to which a cylinder sleeve 9 is attached by spaced studs 11. Seating rings 12 are provided on the body 6 and are adapted to be engaged by double discs 13 and 14 provided on either side of a valve structure, generally indicated at 16. Discs 17 and 18 are provided on opposite sides of the valve being held in place by retainers 19. The discs are moved into position by an upper wedge 21 and a lower wedge 22. The wedges are mounted upon a wedge stud 26 and are retained thereon by wedge nut 27 which is retained in a fixed position by a wedge pin 28, the nut 27 resting upon a washer 29.

The wedge stud 26 is mounted in the head 41 of annular piston 40, the piston having an annular skirt 42 and being movable in cylinder sleeve 9. Upper and lower sets of piston rings 43A and 43B (suitable for high temperature and pressure) are provided between the cylinder sleeve 9 and piston sleeve 8 at opposite ends of the piston 40. The upper end of the cylinder sleeve 9 is closed by cylinder head 44 held in place by bolts 46. A plunger or piston guide 48 secured by studs 49 to cylinder head 44 serves to guide the travel of the piston 40. It is to be noted that the annular upper end 45 of piston 40 is of a larger diameter than is the lower end 41 of the piston. This provides a differential piston effect in that if a fluid is applied to both ends of the piston, even though both fluid applications are at the same unit pressure, because the upper end of the piston has a larger diameter than the lower end, the piston will move downwardly in the cylinder sleeve 9.

A pilot valve 51 is movably mounted in the cylinder head 44 and includes a valve plug 52 adapted to seat in pilot valve opening 53. Pilot valve 51 is movable by piston 56 provided in cylinder 57, spring 58 being interposed between the piston 56 and the opposite end 59 of cylinder 57, spring 58 biasing the piston upward, tending to hold the pilot valve open. The cylinder is secured in place by studs 61.

Figure 3:
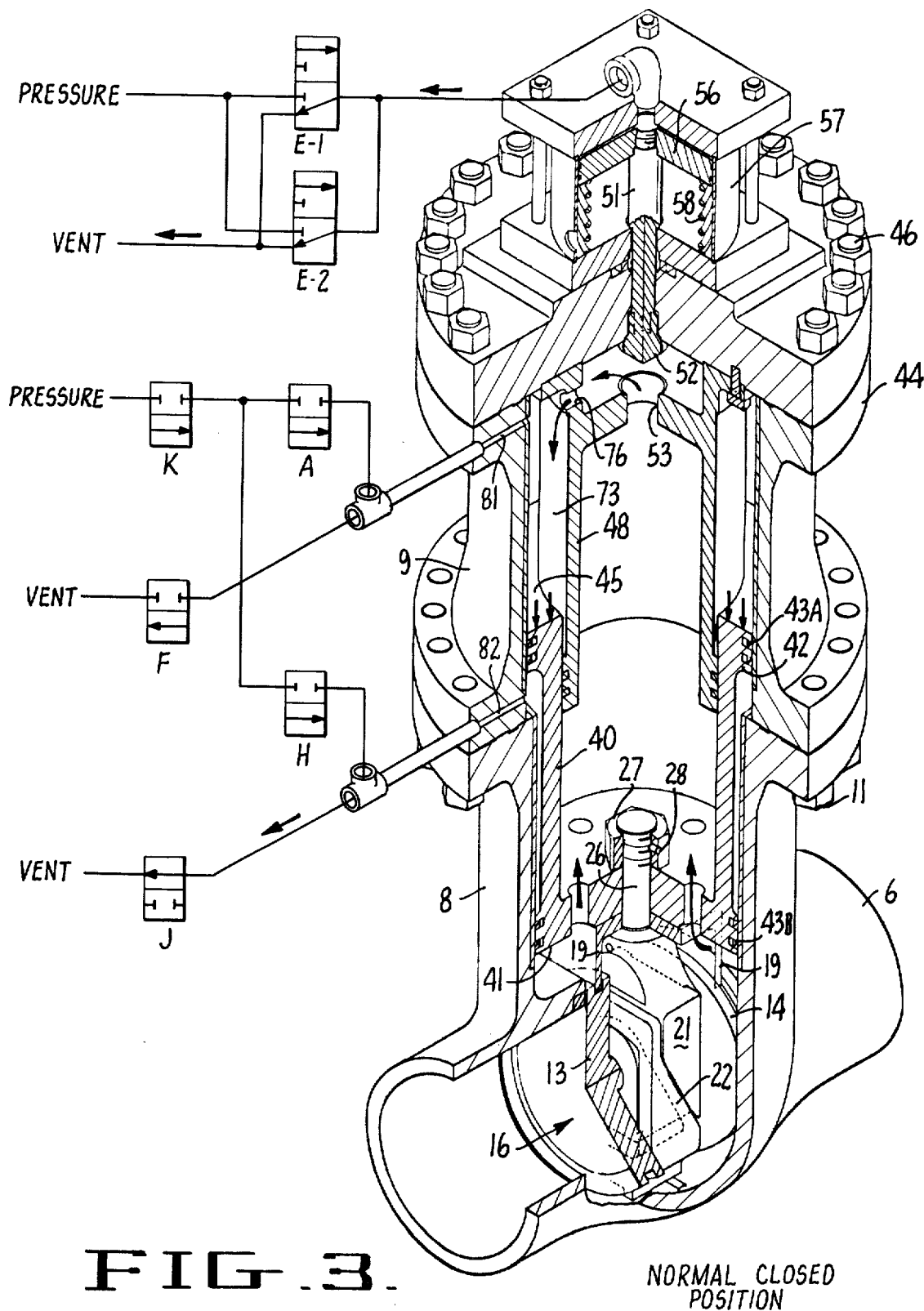
FIG. 3 is a perspective view partly in section showing the valve in its normal closed position and showing diagrammatically the various force applications.

Body cavity 6 will always be pressurized and independent of the flow direction. At normal flow direction or reverse flow, in a case of an upstream rupture of the main steam line, line steam pressure will push valve discs toward the low pressure side, sealing tightly the downstream seats. Forward movement of a valve disc will produce a gap between a disc and seat ring on the upstream side, allowing steam to enter body cavity 6 and through passage 74 into the interior of piston 40 through opening 53 and passage 76 to apply pressure to chamber 73 and piston end 45 and move piston 40 downwardly. The resultant force will close the main steam valve, as is shown in FIGS. 1 and 3. Compression spring 80 (FIG. 1) may be included to bias the valve to close.

Control of valve operator piston 40 is performed by selectively venting or applying pressure to pilot cylinder 57 and also to the opposite ends of chamber 73 through passages 81 and 82. This control is performed by solenoid operated valves and appropriate pressure and vent lines. The pressure line may conveniently be connected to a supply of compressed air or nitrogen.

Figure 4:
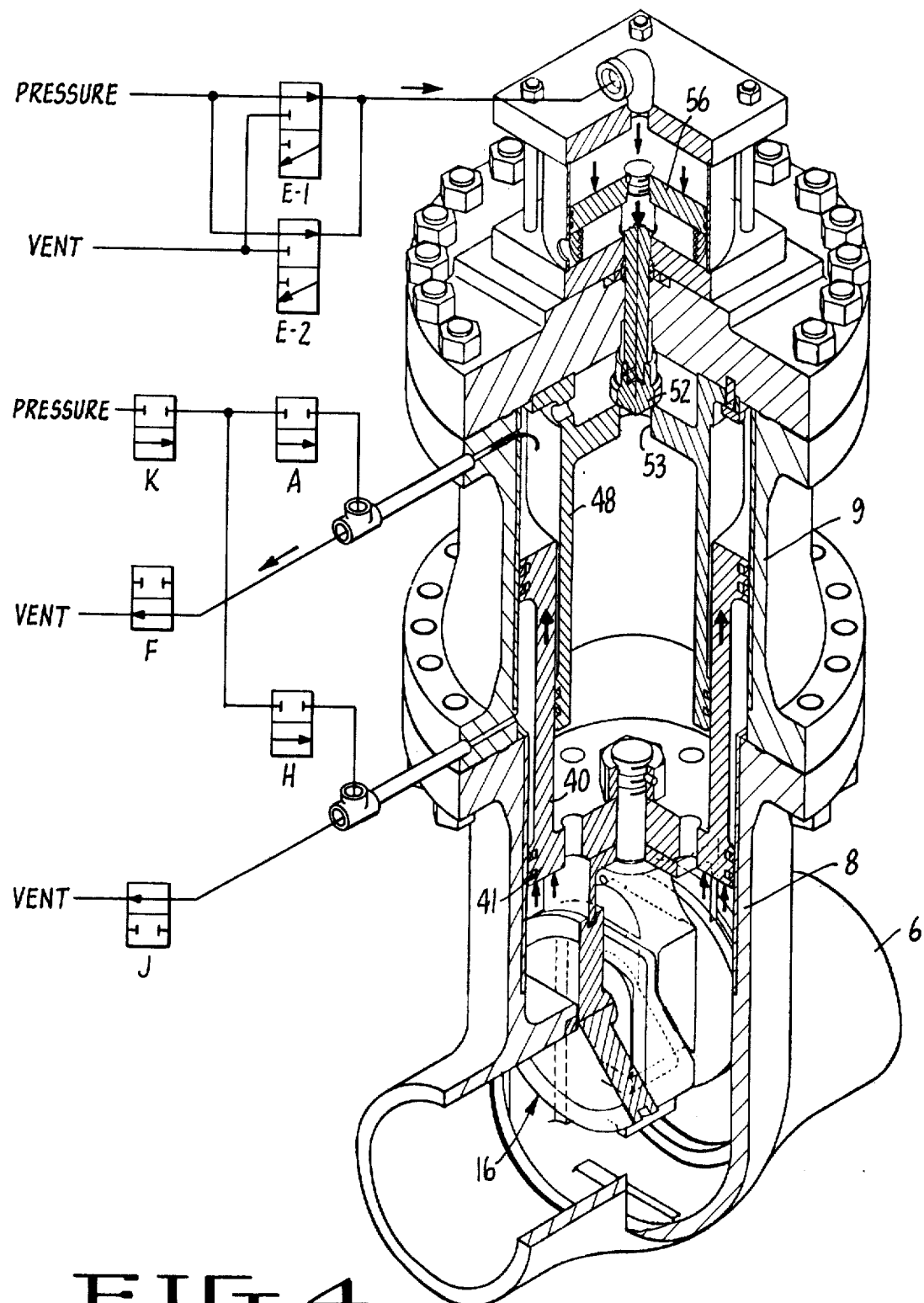
FIG. 4 is a perspective view showing the normal opening mode of operation, again with the force indications being applied.

To open the main steam isolation valve (see FIG. 4), the normally open solenoid valves E1 and E2 are energized, directing 70–100 psi air (from a source not shown) to piston 56 causing the piston to move against spring 58, closing the valve 52. At the same time, valve F vents chamber 73 through passage 81 whereby the steam pressure acting on piston head 41 causes the main steam isolation valve to open to the position shown in FIG. 5.

Figure 5:
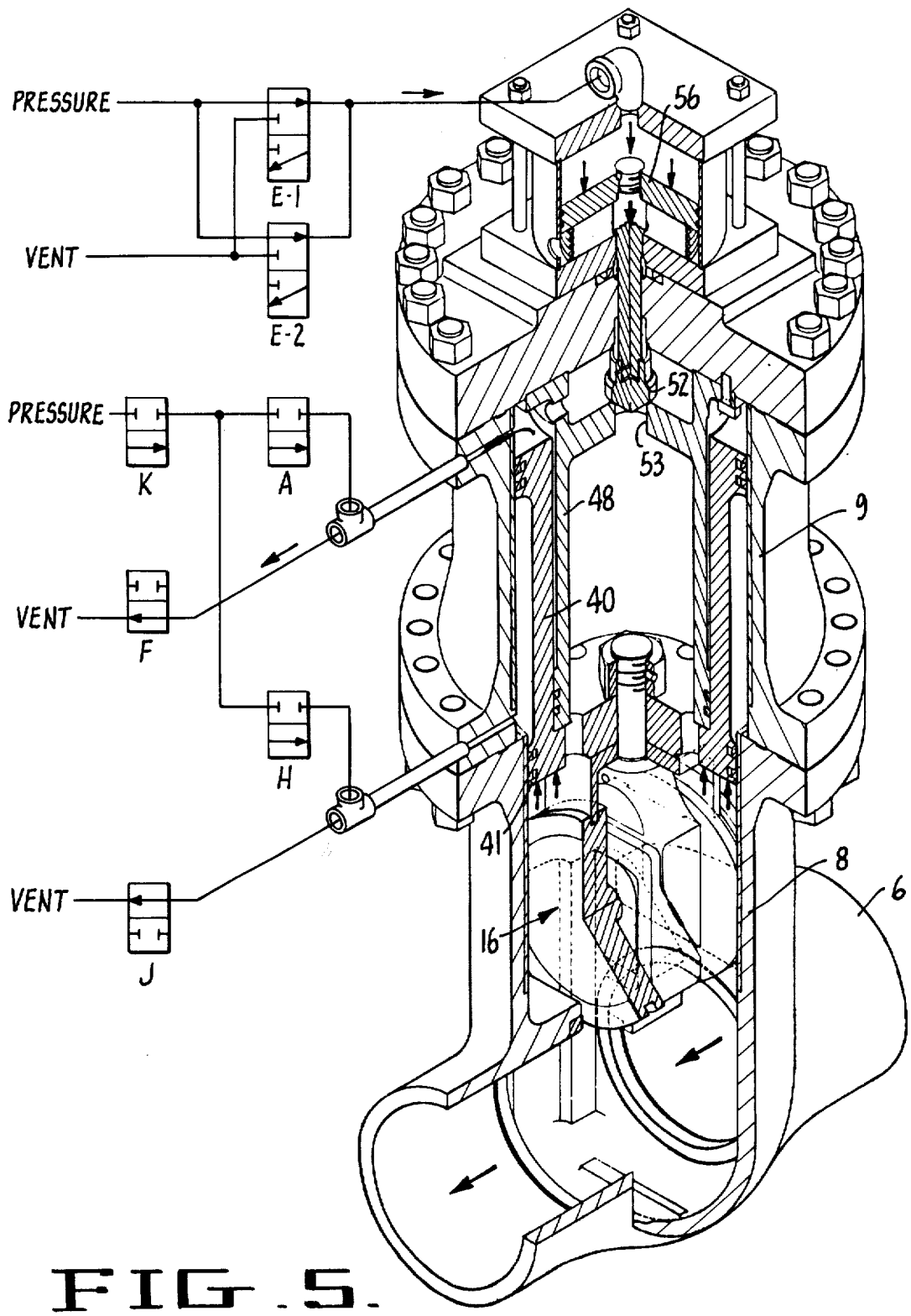
FIG. 5 shows the valve in normal open position with various force applications applied diagrammatically.
Figure 6:
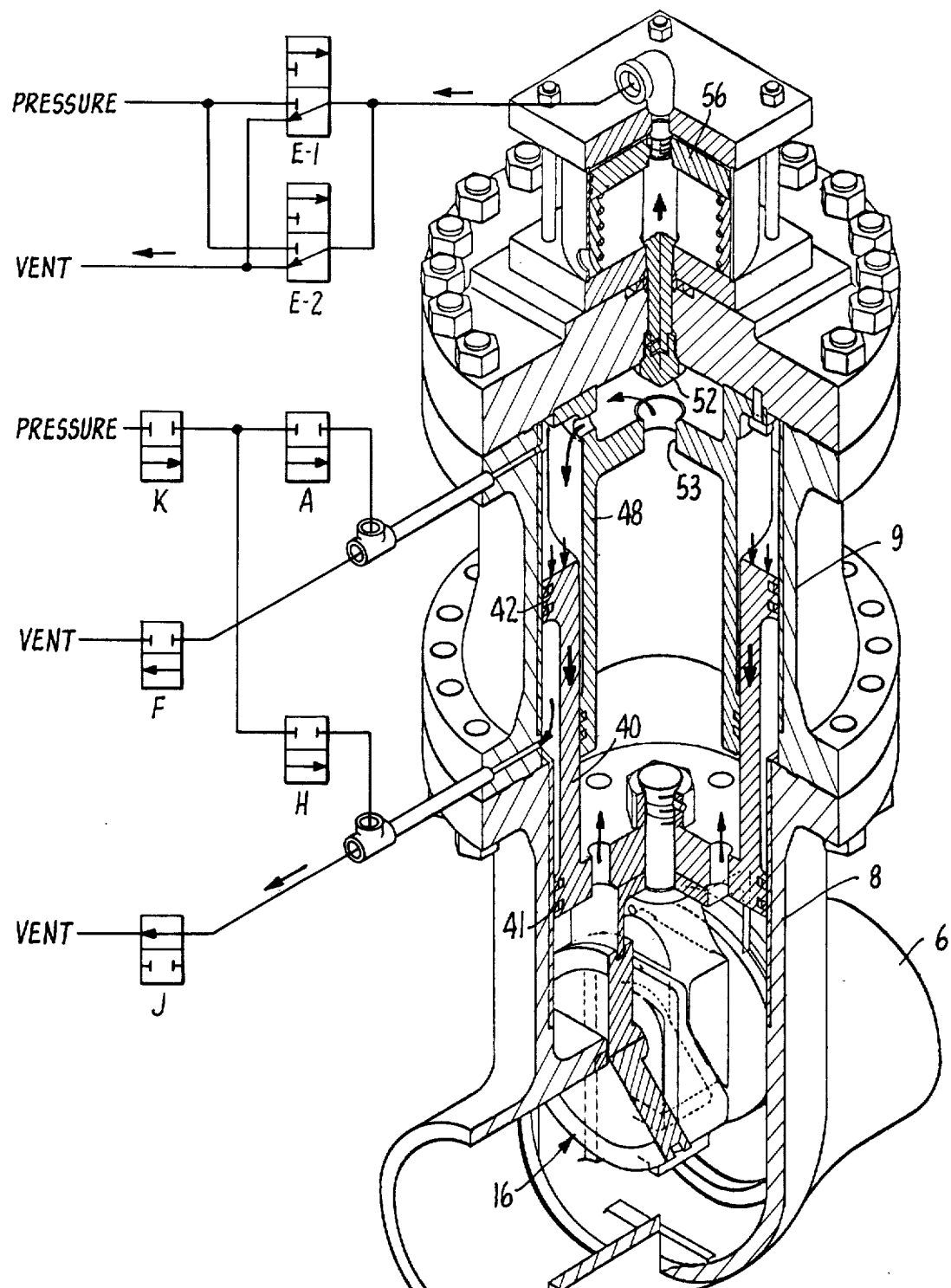
FIG. 6 is a perspective view showing the force applications during normal closing operation.

To close the main steam isolation valve from the open position of FIG. 5, solenoid valves E1 and E2 are de-energized (FIG. 6). Air pressure is released from the chamber above piston 56 and spring 58 and line pressure in body cavity 6 causes valve 52 to open. Valve F is closed at the same time. This permits steam pressure to build up above piston end 42, closing the valve as previously described.

In FIG. 5 the main steam isolation valve is shown in the full open, normal operating position. There are several postulated malfunctions that can occur when the main steam isolation valve is in this position:

1. Valves A and K could both fail in the open position. This would have no effect on the main steam isolation valve as the compressed nitrogen would be vented through valve F.
2. Valves H and K could both fail in the open position. This would have no effect on the main steam isolation valve as the compressed nitrogen would be vented through valve J.
3. A loss of supply pressure or a failure of either of valves E1 or E2 results in piston 56 moving upward causing valve 52 to unseat. This would result in the main steam isolation valve closing. The main steam isolation valve would remain closed until pressure was restored to piston 56.

In FIG. 6 the main steam isolation valve is shown closing. Valves E1 and E2 are de-energized causing valve 52 to unseat and valve F is deenergized preventing steam from exhausting from above piston end 42.

The two postulated malfunctions that can occur are:

1. Valve F fails to close when de-energized. This will have no serious effect on the main steam isolation valve as the vent line is sized to restrict steam flow and permit the main steam isolation valve to close.
2. A failure to exhaust the pressure above piston 56 would prevent the main steam isolation valve from closing. The pressure above piston 56 will be exhausted if either (not both) valve E1 or E2 shifts to the exhaust position, thus satisfying the requirement to meet single component failure.

Figure 7:
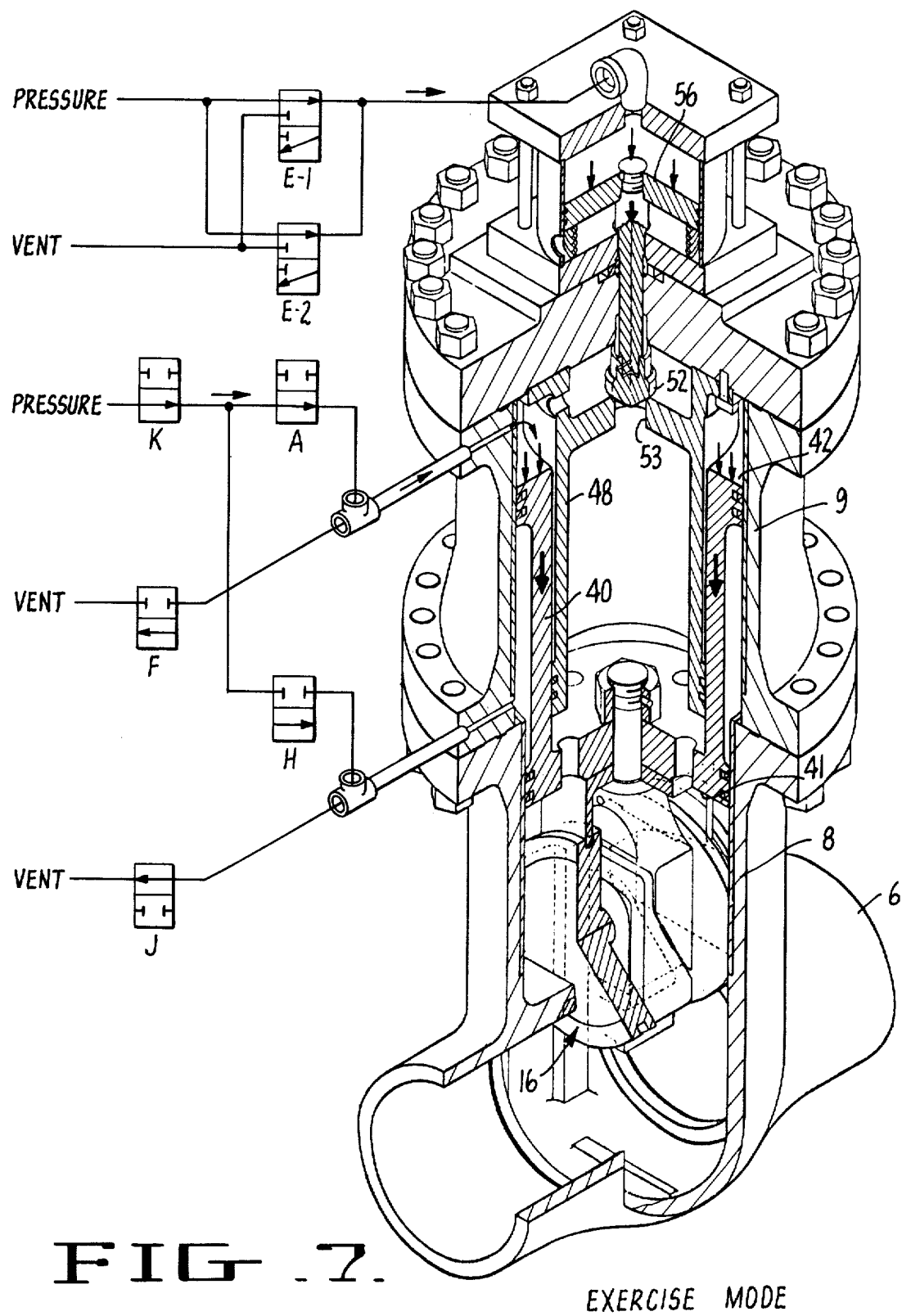
FIG. 7 is a perspective view showing the application of forces for moving the valve into closing position upon the application of pressure during an exercise mode.

The main steam isolation valve can be moved to a position in which it is opened to say 85%–90% of the open position by closing pilot valve 52, energizing and shifting to open position control valves K and A, de-energizing valves F and H and shifting them to the closed position (FIG. 7). High pressure nitrogen gas will be introduced to above piston end 42. In FIG. 7 the main steam isolation valve is shown in the 10% exercised position.

The total closing force consists of the weight of parts, spring force (if used), and gas pressure. When the sum of these forces exceeds the force of the steam or piston end 41, the main steam isolation valve will move in the closing direction. As the valve is closing, the spring force reduces by the product of the spring rate times the distance moved. When the reduction in spring force causes the opening thrust to equal the closing thrust, the main steam isolation valve will stop closing. The main steam isolation valve will stay in this position until valves A, K and F are returned to their positions for normal opening. The control is proportioned to ensure that a closing signal will override the exercise signal to valves A and K.

Figure 8:
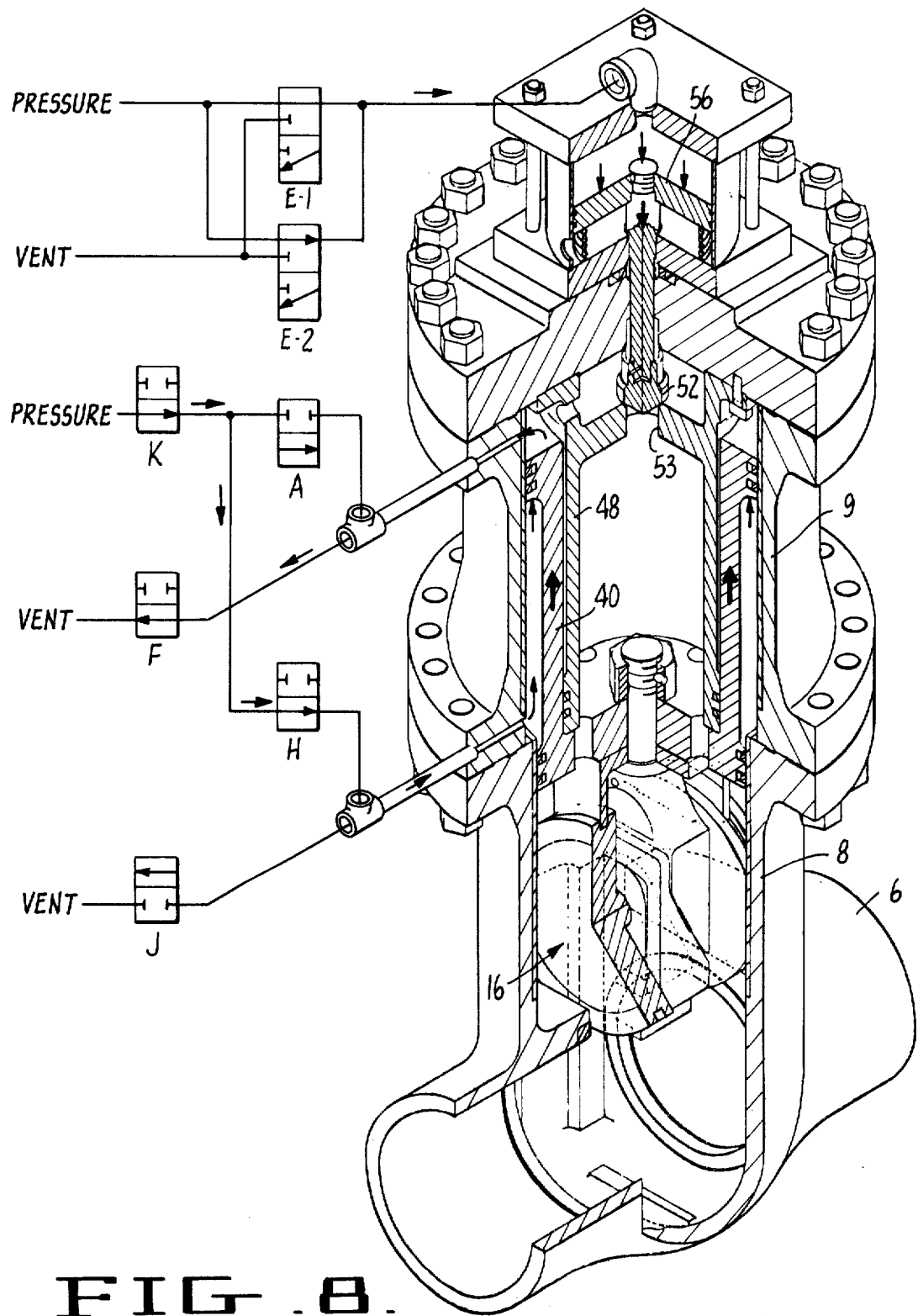
FIG. 8 is a perspective view showing the force application for moving the valve into open position during an exercise mode.

In FIG. 8 provision is made to exercise control valve 52 through a 100% stroke while maintaining the main steam isolation valve in the full open position. Valve J is closed and valves K and H are opened to pressurize the chamber between upper and lower seals 43A and 43B. Valves E1 and E2 are momentarily de-energized to permit valve 52 to stroke. Once again, the control is proportioned to ensure that a closing signal will override the exercise signal to valves E, K, H and J.

Figure 9:
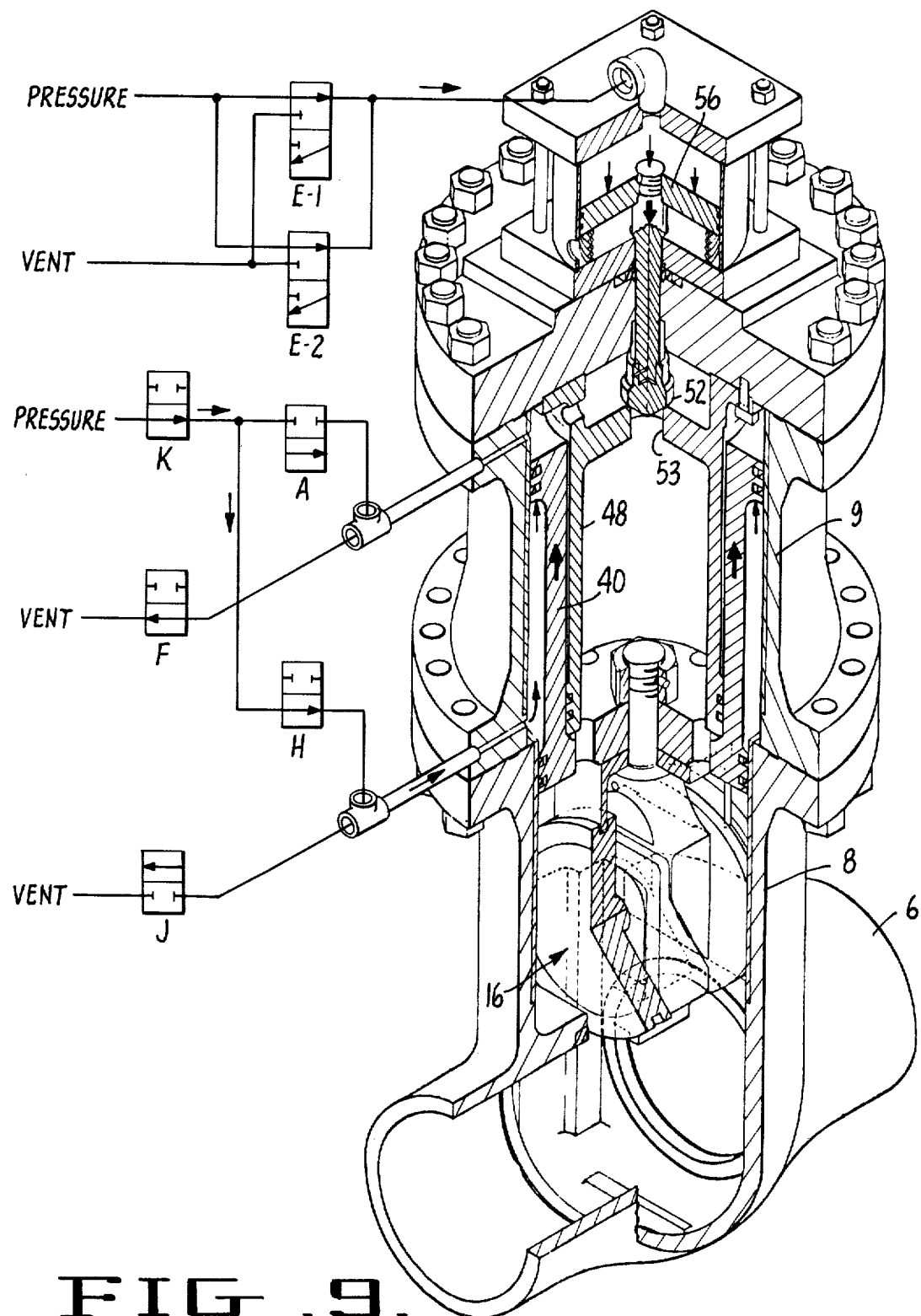
FIG. 9 is a perspective view showing the valve being moved into open position with zero pressure in the pipeline.

In FIG. 9 provision is made to open the main steam isolation valve during the construction stages or at other times when there is no steam in the main steam lines. Valves J, K and H are all energized. Valve J blocks blocks the lower vent line, while valves K and H permit high pressure nitrogen to fill the outer chamber between the upper and lower seals.

Emergency closure of the main steam isolation valve is accomplished by shifting two valves. The first of these valves must function to vent pressure from the control cylinder. To satisfy single component failure, two valves E1 and E2 in parallel are supplied. Failure of the second vent valve J will not prevent closure of the main steam isolation valve. Its only function is to prevent steam flow in the vent line when the main steam isolation valve is closed.

A special feature has been included to permit operation of the valve in a dry pipeline. Pressure can be injected through control valve H from the source of high pressure nitrogen used for the valve exercising mode previously described. To close the main valve, control valve H is closed and valve J is opened.

The remainder of the valves in the control system are for auxiliary functions such as exercising.

Figure 10:
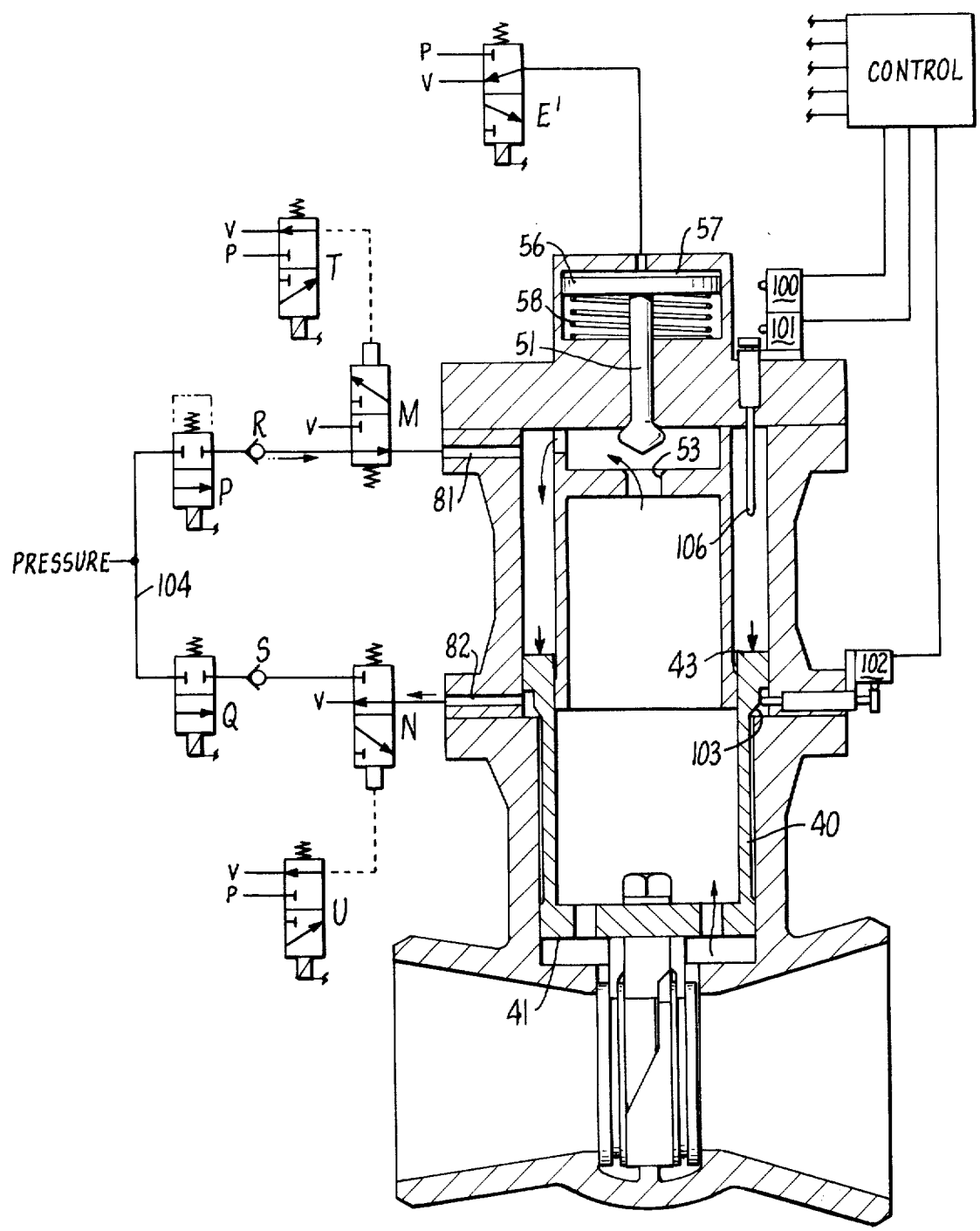
FIG. 10 is a diagrammatic view of another control system for the valve, illustrating the main valve and control valves in the fully closed mode.
Figure 11:
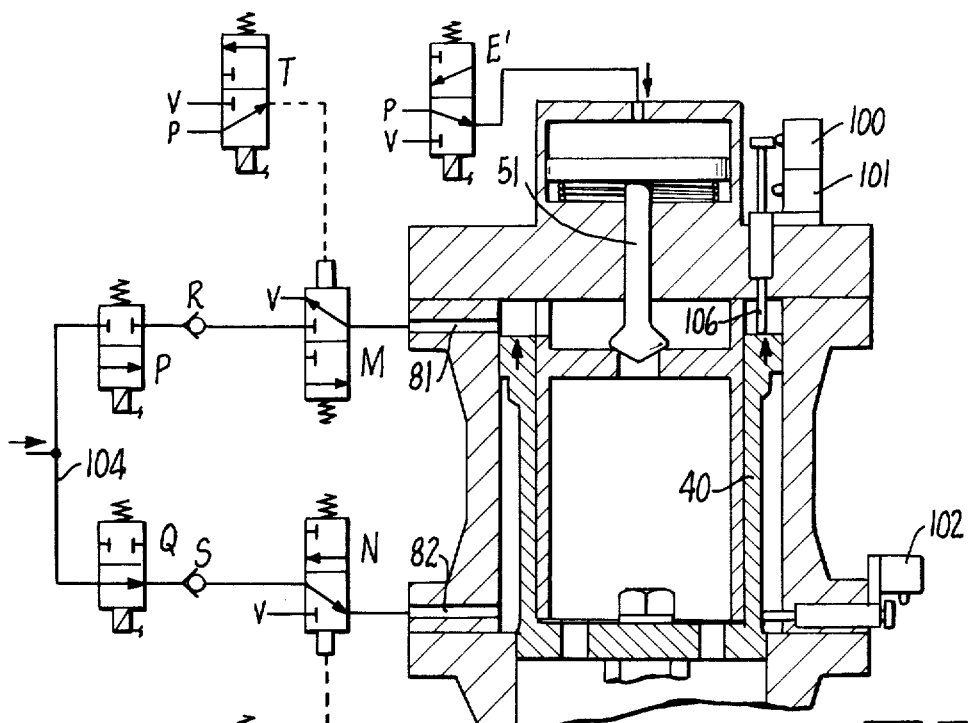
FIG. 11 is a partial view of the system in FIG. 10 and illustrating the system in the fully opened mode.
Figure 12:
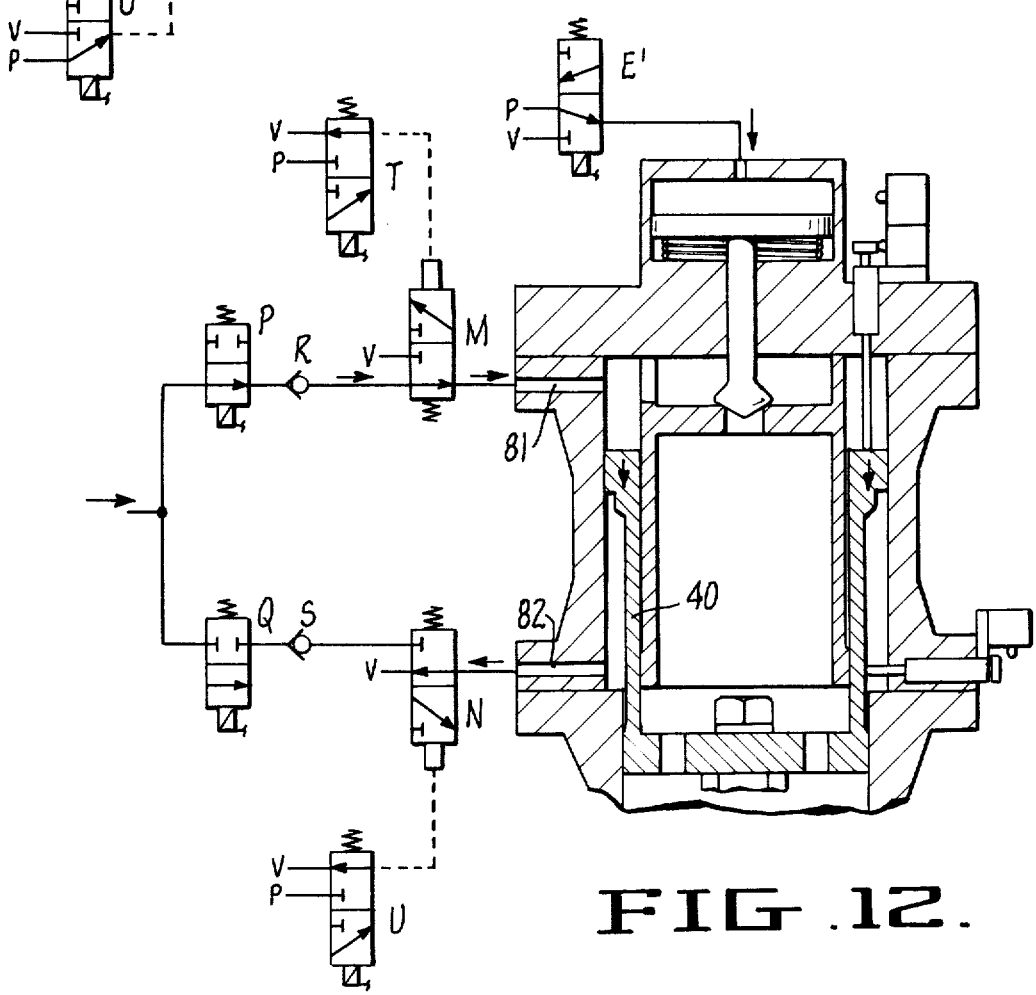
FIG. 12 is a view similar to FIG. 11 with the system in the exercising mode.

FIGS. 10, 11 and 12 illustrate the main steam isolation valve in which limit switches 100, 101 and 102 detect the position of piston 40. These switches detect the valve in the 100% open position, the 80 to 90% open (or exercising) position and in the 100% closed position. Utilizing these switches with appropriate control valves allows the valve actuator to be exercised in an automatic mode through a central control panel or by directly utilizing the switch contacts of the limit switches.

Passages 81 and 82 are controlled by control valves M and N, respectively, to be vented or connected in an external high pressure system. Valves P and Q are solenoid actuated valves responsive to the central control to either join or block the high pressure system with valves M and N. Check valves R and S are interposed between valves M and P and valves N and Q to prevent line steam pressure from entering the external high pressure system. Valves M and N are air actuated, spring return valves responsive to the condition of solenoid actuated control valves T and U.

FIG. 10 shows the valve structure and control diagram in the "valve closed" mode of operation. Pilot valve cylinder 57 is vented through control valve E1 allowing spring 58 to unseat pilot valve 51 and apply line steam pressure to chamber 73 at the upper end 45 of piston 40 in a manner similar to the preceding system. Piston 40 includes tapered shoulder 103 which bears against the feeler arm of switch 102 when the valve is fully closed. The valve may be externally power assisted to close by energizing solenoid valve P to supply high pressure nitrogen from line 104 through valve M to passage 81.

FIG. 11 illustrates the valves in the fully open mode of operation. Valve T is energized to apply control pressure to valve M, shifting valve M to vent passage 81 and the upper end of chamber 73. Pilot valve 51 is similarly closed by control pressure through valve E1. Line steam pressure acts on the lower end 41 of piston 40 to move the valve to the fully open position. If desired, valve U may be energized to apply control pressure to shift valve N while valve Q is energized to apply external high pressure nitrogen to passage 82 and assist in the opening of the valve. In the fully open position, feeler arm 106 will trip switch 100.

FIG. 12 illustrates the valve in the "exercising" mode of operation. Valve T is de-energized and allows valve M to be spring returned from a position of venting chamber 73 through passage 81 and to a position allowing communication of passage 81 to valve P. Valve P is energized to introduce high pressure nitrogen into passage 81 through check valve R. When this high pressure overcomes the system steam pressure acting at the lower end 41 of piston 40, the main steam valve will move downward until it reaches 80 to 90% of the fully opened position. Feeler arm 106 will also move downward until switch 101 is tripped. At this point valve P will be de-energized blocking the high pressure nitrogen. Valve T will similarly be energized to shift valve M thereby venting chamber 73 and allowing main steam pressure to fully extend piston 40 and fully open the main valve.

Under normal operating conditions, the exercising mode may be performed in an automatic manner by utilizing the switches 100 and 101 to reverse the cycle for repositioning valves P and T. In case of control air pressure failure or power failure to the various solenoid valves, valves M and N would be positioned by their respective return springs to close passage 81 and vent passage 82 and allow the main valve to function in a fail safe manner as outlined in the device of FIGS. 1–9. Control valve N is used principally during start-ups or for exercising the main valve without steam in the system.

Valves M and N are shown diagrammatically in FIGS. 10, 11 and 12 and may physically take the form of a two seated plug having two positions between the pressure and venting ports. The plug is carried on a stem and movable by a bellows which is in turn backed up by a spring. Control pressure will act on the bellows to shift the plug while the spring will reposition the plug in the absence of control pressure, thus making the spring a fail safe device for the valve.

The complete control system is panel mounted for ease of installation and maintenance. The only field connections required are one vent line to the panel and three pressure lines from the panel to the valves.

Required gas pressure for exercising is approximately 700 psi. Nitrogen gas pressure can be supplied from an integrally mounted compressor or from a compressed gas storage bottle (not shown). The main steam isolation valve is able to close within five seconds against maximum design differential pressure in either direction. The isolation valve is also constructed to close after experiencing an emergency trip of turbine generator, scram condition, or rupture of the main steam line on either side of the valve. Minimum system pressure to close the valve depends on the valve size and is in the range of 75 to 200 psi.

Many variations can be made in the exact structure shown without departing from the spirit of the invention.

I claim:

1. A valve comprising: a valve body having an inlet passage and an outlet passage; a valve seat in said body between the inlet and outlet passages; a valve member mounted for movement into and out of closed and open relationship relative to the seat; cylinder means mounted on the valve body with one end disposed adjacent the valve seat and the other end remote from the valve body; and annular piston reciprocable in the cylinder means for movement therein and having opposite faces; a tubular piston guide secured coaxially within the cylinder means in radially inwardly spaced relation to the wall of the cylinder means and defining an annular space therebetween; said piston slidably sealed between the cylinder means and the piston guide and slidably movable in said space; means connecting the piston to the valve member to move the valve member toward and away from the valve seat; said piston guide having an opening therein and a pilot valve seat surrounding said opening; a pilot valve mounted for opening and closing movement relative to said pilot valve seat; second cylinder means mounted on the valve body; a pilot valve piston reciprocable in said second cylinder means; means connecting the pilot valve piston with the pilot valve for moving the pilot valve into closing engagement with the pilot valve seat; spring means operatively connected for biasing the pilot valve toward an open position out of engagement with the pilot valve seat; fluid passage means from at least one of the passages in the valve body to admit fluid under pressure from the valve body passages through the valve seat in the body and through the opening in the piston guide when the pilot valve is open and to the space between the piston and the piston guide to act on one of the piston faces to move the piston to move the valve member to closed position; and selectively operable vent means in fluid communication with said space to selectively vent pressure from said space when said pilot valve is closed to enable fluid pressure acting on the other piston face to move the piston to move the valve to open position.

2. A valve as in claim 1, wherein spring means is connected with said annular piston to move the piston and the valve member to closed position.

3. A valve as in claim 2, wherein fluid passage means are connected with the second cylinder means on one side of the pilot valve piston for selectively admitting and exhausting fluid pressure to the pilot valve piston to operate the pilot valve.

4. A valve as in claim 3, wherein control fluid passage means are connected with said cylinder means on opposite sides of said annular piston, and control valve means in said control fluid passage means to selectively apply and vent fluid pressure to opposite sides of said annular piston independently of fluid pressure in said valve body passages to thus operate said valve member between open and closed positions independently of line fluid pressure in said valve body.

5. A valve including
 a. a valve body having an inlet and an outlet,
 b. seating rings provided between the inlet and outlet,
 c. valve discs mounted for movement into and out of engagement with the seating rings.
 d. a first cylinder mounted on the valve body,
 e. a tubular piston fitted in the first cylinder for movement therein,
 f. means connecting the piston to the valve discs,
 g. a piston guide secured to and depending from an upper portion of the valve body.
 h. the piston fitting between the first cylinder and the piston guide and slidably movable thereover,
 i. a pilot valve slidably mounted in an upper portion of the valve body cooperatively opposite a valve seat provided in a plate extending across the upper end of the piston guide,
 j. a second cylinder mounted on the valve body and having a second piston therein for moving the pilot valve toward and away from the opposite valve seat,
 k. a spring biasing the pilot valve toward a position in which the valve in the plate is open,
 l. a passage from the valve body to admit fluid under pressure from the valve body through the valve seat to the space between the piston and the piston guide to move the piston to move the valve discs to closed position.

6. A valve comprising a valve body having an inlet passage and an outlet passage, a valve seat between the inlet and outlet passages, a valve member movably mounted in the valve body for opening and closing movement relative to the valve seat, and operating means connected with the valve member to operate the valve member between its open and closed positions, said operating means including a cylinder on the valve body and a piston reciprocable in the cylinder, means connecting the piston with the valve member to operate the valve member, fluid passage means extending from the inlet passage to the cylinder on opposite sides of the piston to convey fluid pressure to opposite sides of the piston to operate the piston to operate the valve member to its open and closed positions, pilot valve means in operative association with the cylinder to control the fluid pressure in the cylinder and operative when the pilot valve means is open to introduce fluid pressure to one side of the piston to close the valve member, vent means in fluid communication with said cylinder on said one side of the piston and operable to vent fluid pressure from said one side of the piston when the pilot valve means is closed to enable fluid pressure on the other side of the piston to move the piston to open the valve, and additional fluid control means operatively connected with the cylinder on opposite sides of the piston, said additional fluid control means including a source of fluid pressure independent of the fluid pressure in the valve body passages, and control valve means operatively associated with the additional fluid control means to selectively introduce and vent fluid pressure on opposite sides of the piston to operate the piston to move the valve between its open and closed positions independent of fluid pressure in the valve body passages and independent of the pilot valve means.

7. A fail safe valve, comprising: a valve body having inlet passage means and outlet passage means and a valve seat between the inlet and outlet passage means, a cylinder on the valve body, a piston reciprocable in the cylinder, a valve member movably mounted in the valve body between open and closed positions relative to the seat, means connecting the piston with the valve member to move the valve member to its open and closed positions, fluid passage means extending from the inlet passage means to the cylinder on opposite sides of the piston to introduce fluid pressure thereto from the inlet passage means, a fluid pressure operated pilot valve means in operative association with the fluid passage means to selectively control introduction of fluid pressure to one side of the piston to move the piston to close the valve member when the pilot valve means is open, pilot control means establishing fluid communication between the pilot valve means and the fluid pressure in the inlet passage means to selectively introduce and vent said fluid pressure to the pilot valve means to close and open the pilot valve means, biasing means connected with the pilot valve means to open the pilot valve means in the absence of said fluid pressure thereon, and biasing means connected with the piston to move the piston and thus move the valve member to its closed position in the absence of a predetermined fluid pressure in said inlet passage means and thus at said pilot valve means and in said cylinder.

8. A valve as in claim 6, wherein the pilot valve means includes a pilot valve member and wherein a piston is operatively connected to the pilot valve member to operate the pilot valve member between its open and closed positions, pilot fluid passage means connected in fluid communication with one side of the pilot valve piston to introduce and vent fluid pressure therefrom, pilot control valve means connected in said pilot fluid passage means to control supply and venting of pressure from the pilot valve piston, and said additional fluid control valve means including a fluid pressure supply line connected to one side of the piston, a pair of solenoid operated valves connected in series in said supply line, a further supply line connected with said fluid supply line between the valves and connected to supply fluid pressure to the other side of the piston, a solenoid operated valve in said further supply line, a vent line connected with said fluid supply line between the serially arranged valves and the piston, a solenoid operated vent control valve in said vent line, a further vent line connected to said further supply line between the valve therein and the other side of the piston, and a solenoid operated vent valve in said further vent line, said serially arranged valves operable whereby they are both open to supply fluid pressure to said one side of the piston to close the valve when the vent valve in the further vent line is open, and the first of the serially arranged valves operable to an open position with the second valve thereof closed and the valve in the further supply line open to supply fluid pressure to the other side of the piston to open the valve when the vent control valve in the vent line is open, and said pilot control valve means including a pair of supply valves arranged in parallel and a pair of vent valves arranged in parallel, whereby one of the supply and vent valves is operable to operate the pilot valve in the event of failure of the other of the supply and vent valves.

9. A valve as in claim 8, wherein the vent line connected with said one side of the piston is of restricted size so that even in the event the vent valve therein fails in the open position, fluid pressure is enabled to build up on said one side of the piston to close the valve.

10. A valve as in claim 6, wherein limit switch means are operatively positioned in the path of movement of the piston to be operated upon predetermined movement of the piston in a closing direction, and said control valve means are operatively connected with said limit switch means to be operated thereby, so that said control valve means may be operated to admit fluid pressure to the piston to move the piston to close the valve, and upon said predetermined movement, the limit switches effect operation of the control valve means to vent fluid pressure from one side of the piston to enable fluid pressure on the other side thereof to open the valve.

11. A fail safe valve as in claim 7, wherein said pilot control means includes a pair of pressure supply lines connected in parallel with the pilot valve and a pair of vent lines connected in parallel with the pilot valve, and a solenoid operated valve in each of said lines, whereby said valves are operable to effect operation of the pilot valve even in the event of failure of one of said solenoid operated valves.

* * * * *